United States Patent
Bonnette et al.

(10) Patent No.: US 7,917,915 B2
(45) Date of Patent: Mar. 29, 2011

(54) MODEL DRIVEN APPLICATION FRAMEWORK

(75) Inventors: Michael D. Bonnette, Hollis, NH (US); Francis P. Judge, Haverhill, MA (US); Darsono Sutedja, North Andover, MA (US); Rich Long, Nashua, NH (US)

(73) Assignee: Hewlett-Packard Development Comapny, L.P., Houston, TX (US)

( * ) Notice: Subject to any disclaimer, the term of this patent is extended or adjusted under 35 U.S.C. 154(b) by 1039 days.

(21) Appl. No.: 11/229,473

(22) Filed: Sep. 15, 2005

(65) Prior Publication Data

US 2007/0060113 A1    Mar. 15, 2007

(51) Int. Cl.
*G06F 13/00* (2006.01)
(52) U.S. Cl. ......... 719/319; 719/328; 719/331; 715/762
(58) Field of Classification Search .................. 719/319, 719/328, 331; 715/762
See application file for complete search history.

(56) References Cited

U.S. PATENT DOCUMENTS

| | | | |
|---|---|---|---|
| 5,901,319 A * | 5/1999 | Hirst .............................. | 717/164 |
| 6,941,520 B1 * | 9/2005 | Lewallen ...................... | 715/762 |
| 6,957,439 B1 * | 10/2005 | Lewallen ...................... | 719/328 |
| 2005/0060463 A1 * | 3/2005 | Le et al. ........................ | 710/300 |
| 2005/0114832 A1 * | 5/2005 | Manu ............................ | 717/106 |
| 2007/0074192 A1 * | 3/2007 | Geisinger ..................... | 717/148 |
| 2008/0028401 A1 * | 1/2008 | Geisinger ......................... | 718/1 |
| 2008/0280588 A1 * | 11/2008 | Roundtree et al. ............ | 455/405 |

* cited by examiner

*Primary Examiner* — Andy Ho
(74) *Attorney, Agent, or Firm* — Kacvinsky Daisak PLLC (57) ABSTRACT

A system, apparatus, method and article for a modular electronic mail software architecture are described. The apparatus may include a processing sub-system having a processor and memory. The memory may store software components for execution by the processor. The software components may comprise an application program implemented using a model driven application framework and capable of operating with multiple operating systems. Other embodiments are described and claimed.

20 Claims, 7 Drawing Sheets

MODEL DRIVEN APPLICATION FRAMEWORK

BACKGROUND

Communication and computing technologies are starting to converge into a single wireless mobile device with continuously decreasing form factors. For example, handheld "smart phones" are emerging that combine capabilities such as voice and data communications typically provided by a cellular telephone with application programs typically provided by a computer. Consequently, a mobile user may use a single device to make telephone calls, maintain calendars and contacts, browse the Internet, communicate electronic mail ("email"), and more. As the number of application programs resident on a smart phone increases, however, so does the need for increased processing capabilities, such as processor speed, memory size, and power consumption. Accordingly, there may be a need for a software architecture that improves use of limited device resources.

DETAILED DESCRIPTION

Figure 1:
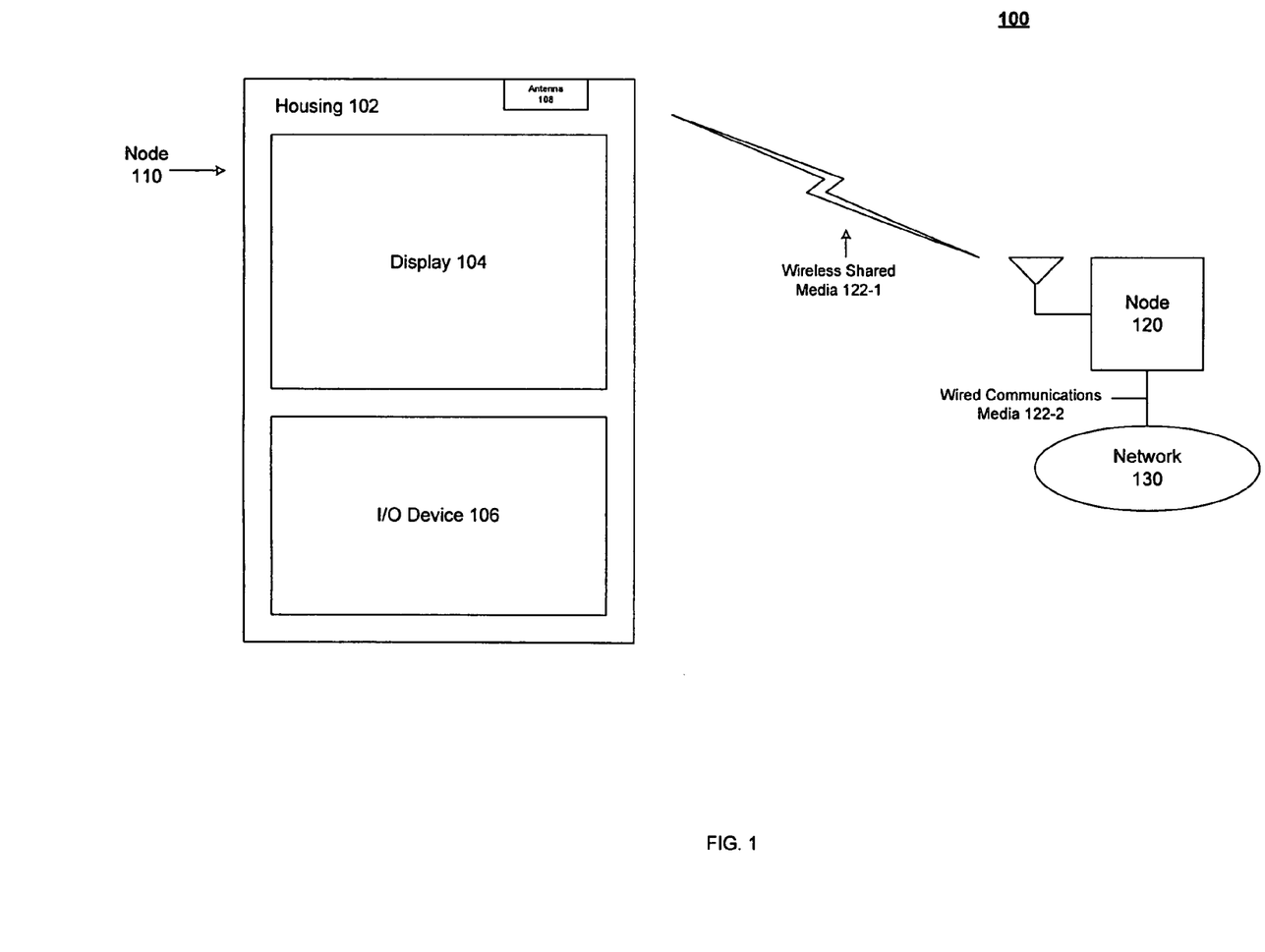
FIG. 1 illustrates one embodiment of a system.

FIG. 1 illustrates one embodiment of a system. FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise a device, such as a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, and so forth. The embodiments are not limited in this context.

In various embodiments, a node or a portion of a node may be implemented using hardware, software, or a combination of both. For example, the hardware may include electronic elements fabricated on a substrate. In various implementations, the electronic elements may be fabricated using silicon-based integrated circuit (IC) processes such as complementary metal oxide semiconductor (CMOS), bipolar, and bipolar CMOS (BiCMOS) processes, for example. Examples of hardware may include electrical or electronic elements, such as a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node or portions of a node may be implemented using software. The term "software" may refer to program instructions and/or data adapted for execution by a processor. The term "program instructions" may refer to an organized list of commands comprising words, values or symbols arranged in a predetermined syntax, that when executed, may cause a processor to perform a corresponding set of operations. Examples of a computer language may include C, C++, Java, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. As used herein, the term "software" may generically encompass any type of software, such as programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

System 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media, sometimes referred to herein as wireless shared media. An example of a wireless communication media may include portions of a wireless spectrum, such as one or more frequencies or frequency bands of the radio-frequency (RF) spectrum. The wireless nodes may include components and interfaces suitable for communicating information signals over the designated wireless spectrum, such as one or more antennas, radios, wireless transmitters/receivers ("transceivers"), baseband processors, amplifiers, filters, control logic, and so forth. As used herein, the term "transceiver" may be used in a very general sense to include a transmitter, a receiver, or a combination of both. The embodiments are not limited in this context.

In various embodiments, system 100 may include a wireless node 110. Wireless node 110 may comprise any node arranged with wireless capabilities. Examples of wireless node 110 may include any of the previous examples for a node as previously described. The embodiments are not limited in this context.

In one embodiment, for example, wireless node 110 may be implemented as a mobile computing device having wireless capabilities. A mobile computing device may refer to any device having a processing system and a mobile power source or supply, such as one or more batteries, for example. Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone capable of executing computer applications, as well as voice communications and/or data communications. Although some embodiments may be described with mobile computing device 110 implemented as a smart phone by way of example, it may be appreciated that other embodiments may be implemented using other wireless mobile computing devices as well. The embodiments are not limited in this context.

As shown in FIG. 1, mobile computing device 110 may comprise a housing 102, a display 104, an input/output (I/O) device 106, and an antenna 108. Display 104 may comprise any suitable display unit for displaying information appropriate for a mobile computing device. I/O device 106 may comprise any suitable I/O device for entering information into a mobile computing device. Examples for I/O device 106 may include an alphanumeric keyboard, a numeric keypad, a touch pad, input keys, buttons, switches, rocker switches, and so forth. The embodiments are not limited in this context.

In one embodiment, system 100 may include a wireless node 120. Wireless node 120 may comprise, for example, a mobile station or fixed station having wireless capabilities. Examples for wireless node 120 may include any of the examples given for mobile computing device 110, and further including a wireless access point, base station or node B, base station radio/transceiver, router, switch, hub, gateway, and so forth. In one embodiment, for example, wireless node 120 may comprise a base station for a cellular radiotelephone communications system. Although some embodiments may be described with wireless node 120 implemented as a base station by way of example, it may be appreciated that other embodiments may be implemented using other wireless devices as well. The embodiments are not limited in this context.

In one embodiment, mobile computing device 110 and wireless node 120 may comprise part of a cellular communication system. Examples of cellular communication systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless node 120 may be arranged to communicate using a number of different wireless wide area network (WWAN) data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. The embodiments are not limited in this respect.

In one embodiment, communication system 100 may include network 130 connected to wireless node 120 by wired communications medium 122-2. Network 130 may comprise additional nodes and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In various embodiments, mobile computing device 110 and wireless node 120 may also be capable of voice and/or data communications. Communications between mobile computing device 110 and wireless node 120 may be performed over wireless shared media 122-1 in accordance with a number of wireless protocols. Examples of wireless protocols may include various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols. The embodiments are not limited in this context.

In various embodiments, mobile computing device 110 may be capable of executing various types of software programs. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager (PIM) applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, mobile computing device 110 may be capable of executing various type of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, and others. The embodiments are not limited in this context.

Developing applications for a mobile computing device such as mobile computing device 110 may be a relatively time consuming and difficult task. Conventional software application development techniques, architectures and frameworks may not be suitable for mobile computing devices for a number of reasons. In conventional systems, for example, application programs are typically designed or created to execute on a device using a single operating system. As the device operating system changes, the application program must be rewritten (ported) to use the new operating system. This may cause considerable amounts of latency in the design and development of new applications. There are a number of programming languages that allow an application program to be created independent of the underlying hardware and operating system of the device, such as JAVA developed by Sun Microsystems and ActiveX® developed by Microsoft Corporation. Such programming languages, however, are typically server based with client components that are downloaded to a device over a communications connection. Furthermore, conventional application development techniques may not be suitable for devices having smaller form factors and limited device resources, such as mobile computing devices. In addition, conventional application development techniques may not have a uniform data access layer or data model, thereby causing each application program to have different data models. Consequently, it may be difficult to create an application program that executes on different operating systems in an efficient, seamless and transparent manner.

Various embodiments may address these and other problems. Various embodiments may be directed to a model driven application framework suitable for a mobile computing device, such as a smart phone. The model driven application framework may be used to develop and execute application programs for smaller devices, such as mobile computing device 110. Furthermore, the model driven application framework may be used to port existing application programs to new platforms having different operating systems. In addition, the model driven application framework may use a data access layer or data model that is uniform for all application programs resident on mobile computing device 110.

In one embodiment, for example, mobile computing device 110 may comprise a radio sub-system to perform voice and/or data communications and a processing sub-system to connect to the radio sub-system. The processing sub-system may have a processor and memory. The memory may store software components for execution by the processor. The software components may include one or more application programs implemented using a model driven application framework. The model driven application framework may allow the application program to operate using different underlying hardware platforms and/or operating systems. System 100 in general, and mobile computing device 110 in particular, may be described in more detail with reference to FIG. 2.

Figure 2:
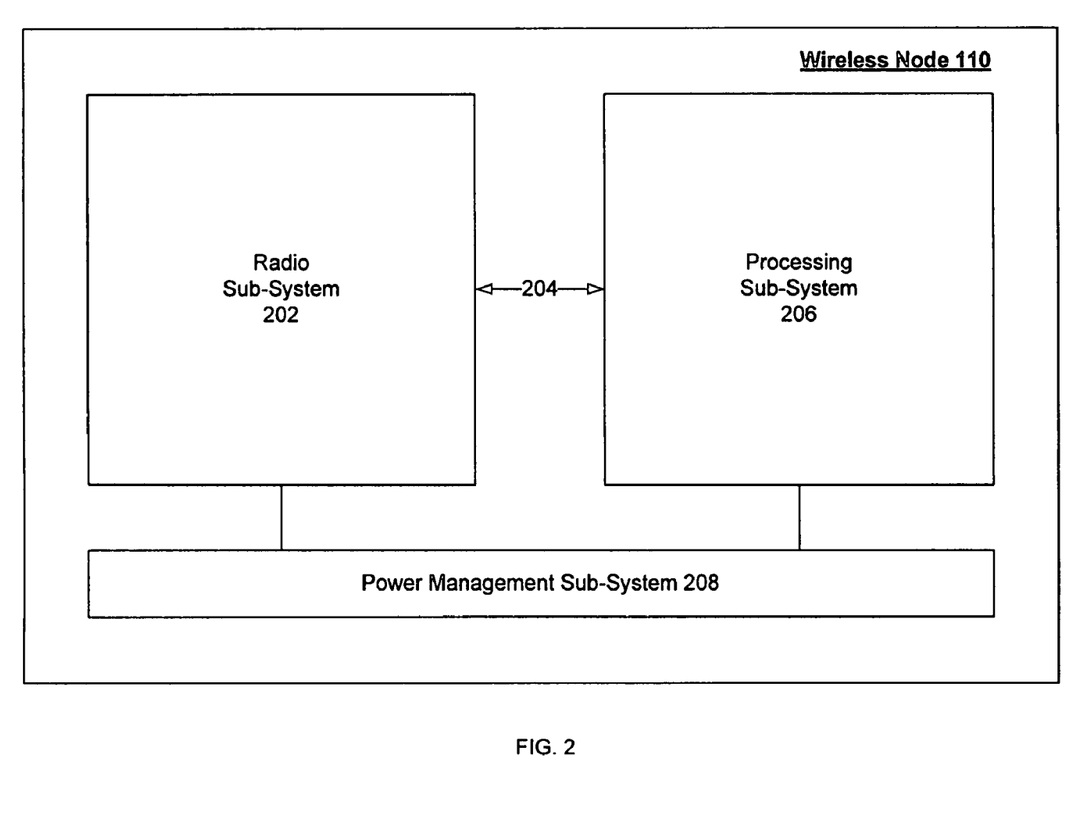
FIG. 2 illustrates one embodiment of a node.

FIG. 2 illustrates one embodiment of a node. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to node implementations. The embodiments are not limited in this context.

In various embodiments, mobile computing device 110 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

In various embodiments, mobile computing device 110 may also include a power management sub-system 208. Power management sub-system 208 may manage power for mobile computing device 110, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
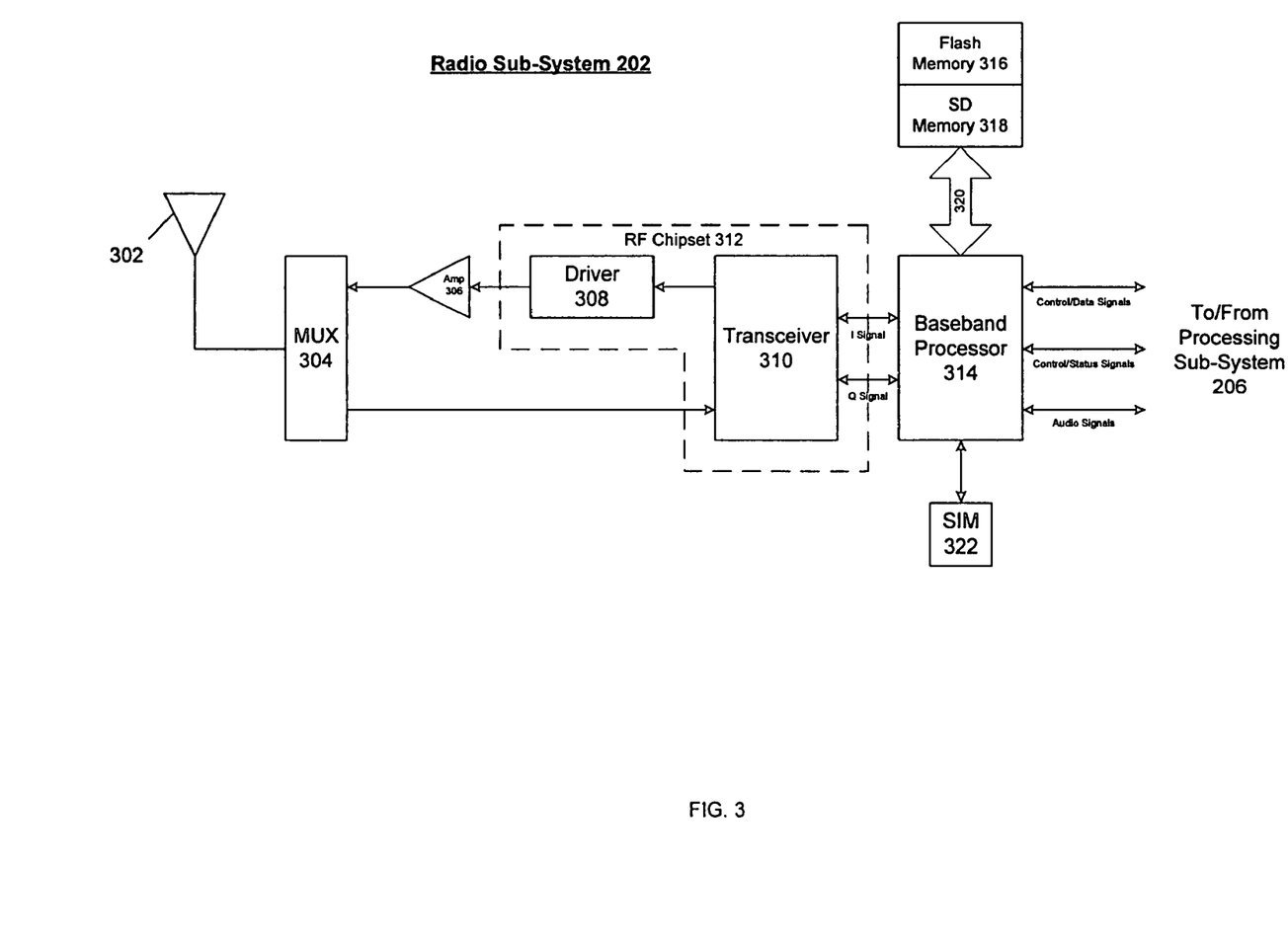
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include an antenna 302. Antenna 302 may be representative of, for example, antenna 108 as described with reference to FIG. 1. Antenna 302 may broadcast and receive RF energy over wireless shared media 122-1. Examples for antenna 302 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

In various embodiments, antenna 302 may be connected to a multiplexer 304. Multiplexer 304 multiplexes signals from amplifier 306 for delivery to antenna 302. Multiplexer 304 demultiplexes signals received from antenna 302 for delivery to RF chipset 312. The embodiments are not limited in this context.

In various embodiments, multiplexer 304 may be connected to a power amplifier 306. Power amplifier 304 may be used to amplify any signals to be transmitted over wireless shared media 122-1. Power amplifier 304 may work in all assigned frequency bands, such as 4 frequency bands in a quad-band system. Power amplifier 304 may also operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifier 306 may be connected to an RF chipset 312. RF chipset 312 may also be connected to multiplexer 304. In one embodiment, RF chipset 312 may comprise an RF driver 308 and an RF transceiver 310. RF chipset 312 performs all of the modulation and direct conversion operations required for GMSK and 8-PSK signal types for quad-band E-GPRS radio. RF chipset 312 receives analog I & Q signals from a baseband processor 314, and converts them to an RF signal suitable for amplification by amplifier 306. Similarly, RF chipset 312 converts the signals received from wireless shared media 122-1 via antenna 302 and multiplexer 304 to analog I & Q signals to be sent to baseband processor 314. Although RF chipset 312 uses two chips by way of example, it may be appreciated that RF chipset 312 may be implemented using more or less chips and still fall within the intended scope of the embodiments. The embodiments are not limited in this context.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
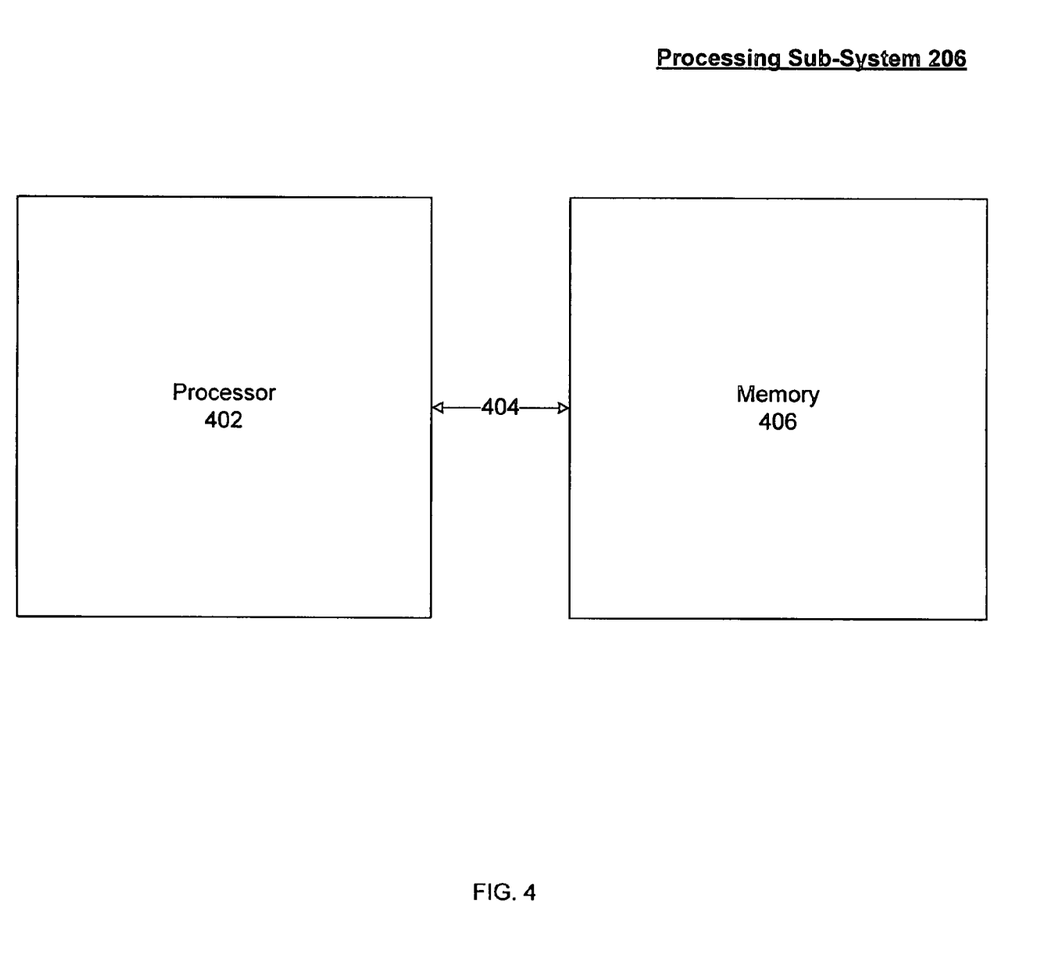
FIG. 4 illustrates one embodiment of a processing sub-system.

FIG. 4 illustrates one embodiment of a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement operations for the various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. A collection of software components for a given device may be collectively referred to as a software architecture. The various application programs for a given software architecture may be developed using a model driven application framework. In one embodiment, for example, the model driven application framework may be implemented using a model-view-controller (MVC) architecture. Model-View-Controller (MVC) is a software architecture that separates a data model, user interface, and control logic for an application program into three distinct components so that modifications to one component can be made with reduced impact to the others. An example of a MVC architecture suitable for mobile computing device 110 may be described in more detail with reference to FIG. 5.

Figure 5:
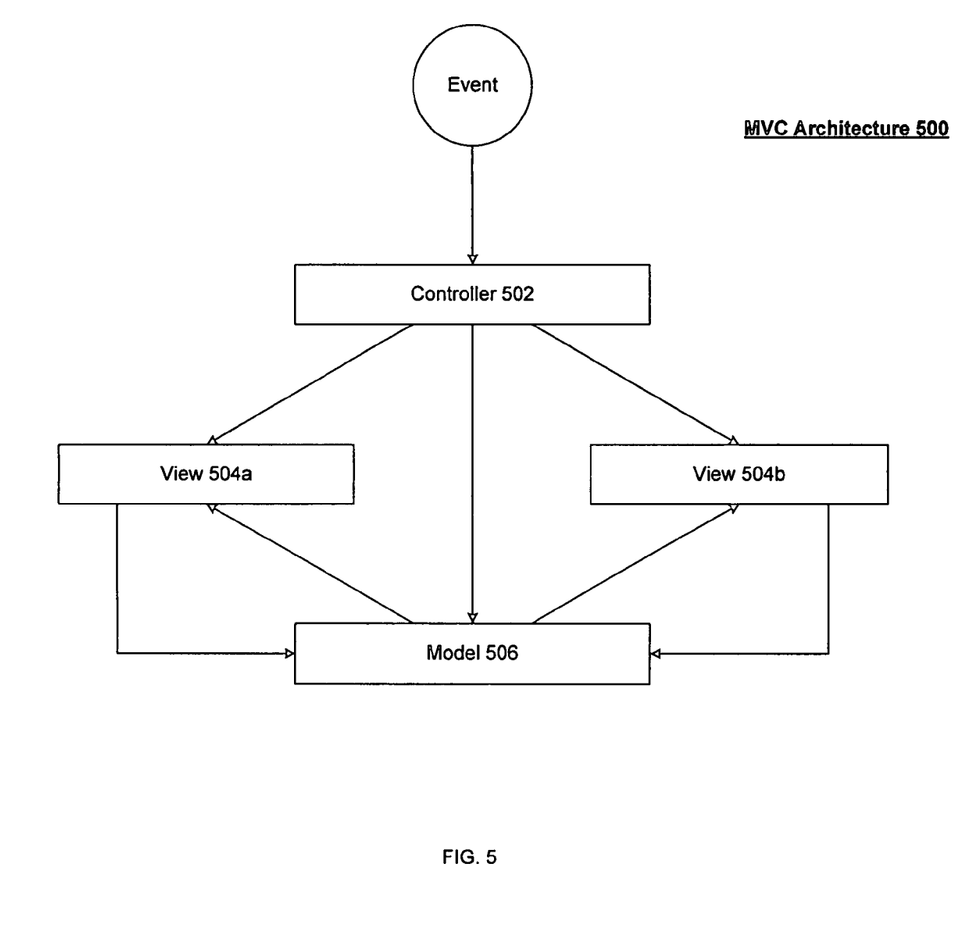
FIG. 5 illustrates one embodiment of a model-view-controller architecture.

FIG. 5 illustrates one embodiment of a MVC framework. FIG. 5 illustrates a MVC architecture 500 suitable for use with mobile computing device 110. As shown in FIG. 5, MVC architecture 500 may include multiple software components, such as a controller module 502, view modules 504a, 504b, and a model module 506. The software components shown in FIG. 5 are representative of some of the software components comprising MVC architecture 500. In some embodiments, some software components may be omitted and others added. Further, operations for some programs may be separated into more software components, or consolidated into fewer software components, as desired for a given implementation. The embodiments are not limited in this context.

In general terms, constructing an application using a MVC architecture involves defining three classes of modules or layers. A first class of modules includes a model module 506. Model module 506 provides a domain-specific representation of the information on which the application program operates. A second class of modules includes view modules 504a, 504b. View modules 504a, 504b render the information from model module 506 into a form suitable for interaction, typically a user interface element (e.g., GUI). A third class of modules includes a controller module 502. Controller module 502 responds to events, typically user actions, and invokes changes on the model module 506 or view modules 504a, 504b as appropriate.

Controller module 502 and view modules 504a, 504b are part of the presentation layer (the user interface) in the standard presentation/domain/data access layering. In MVC, the presentation layer is further split into controller module 502 and view modules 504a, 504b. There is a similar separation between the presentation layer and the domain layer.

In operation, MVC architecture has a control flow that typically begins with a user interacting with the user interface in some way, such as pressing a button. Controller module 502 receives notification of the user action from the user interface objects. Controller module 502 accesses model module 506, possibly updating it in a way appropriate to the user's action. Model module 506 operates in the domain layer. Model module 506 may implement business logic or domain logic in order to perform operations using stored data.

Some applications use a persistent storage mechanism such as a database to store the data, although MVC does not specifically define a data access layer. In one embodiment, for example, application programs for mobile computing device 110 may implement a data access layer using a standard set of interfaces referred to herein as "IData" interfaces. The IData interfaces may comprise a collection of programmatic interfaces (API) that provide data access to application data models. Information and data for an application program may be manipulated using the IData interfaces and associated data structures and/or objects. The use of a standard set of interfaces ensures a uniform data model for all application programs resident on mobile computing device 110.

In various embodiments, for example, an application program may be arranged to use an IData interface for the data access layer. The IData interfaces may allow external programs access to the application program data store and configuration information. For example, assume the application program is a mail client. Data associated with a mail client account, folder, message, and attachment are considered individual containers or objects. Each individual container is represented as an interface. A mail client may have a set of mail client interfaces, such as an IAccount interface, an IFolder interface, an IMessage interface, an IAttach interface, and so forth. Each individual interface has a set of operations that allow the manipulation of objects in that container.

In addition, all of the individual IData interfaces follow a hierarchy. At the top of the hierarchy is IAccount. In our example of a mail client, an account (IAccount) has folders (IFolder) that contain messages (IMessages) that could in turn contain attachments (IAttach). An opaque handle uniquely identifies each container, providing sufficient information to allow traversing of the hierarchy. Within the hierarchy is paradigm that applies to all the interfaces that make up the IData interfaces. Objects within a container are created, saved, and released. All this is accomplished through the interface subroutines provided.

Each saved object can be identified by its handle or persistent ID. Given an object handle the caller can retrieve the persistent ID and vice versa. The handle is used in the API for all accesses to the object. The persistent ID is an efficient identifier of an object when the object needs to be retrieved at a later time once the object has been released. The memory needed for the persistent ID is always allocated by the caller. The size of the persistent ID is the minimum needed in order for the API library to track the object and maintain peak performance for retrieval of the object.

View modules 504a, 504b may use model module 506 to generate an appropriate user interface for an application program. View modules 504a, 504b receive its own data from model module 506, or alternatively, may receive data from the data access layer directly if there is no domain logic to accomplish this operation. Model module 506 typically has no direct knowledge of view modules 504a, 504b. The observer pattern, however, may be used to provide some indirection between model module 506 and view modules 504a, 504b, thereby allowing model module 506 to notify interested parties of a change. A view object can register itself with model module 504 and listen for changes, but the model itself remains view-independent. Controller module 502 does not typically pass domain objects (the model) to view modules 504*a*, 504*b* although it might issue a command telling view module 504*a*, 504*b* to update itself. The user interface then waits for further user interactions, which begins the control flow over again.

MVC architecture 500 may allow certain application programs to be almost completely platform-independent. Since model module 506 and controller module 502 generally have limited or no knowledge of view modules 504*a*, 504*b*, an application program developer is free to implement both in any cross-platform language. As a result, porting the application may be limited to redesigning the interface (or view) for the new operating system. The use of a platform-specific language may be limited to notifying controller module 502 of user events, and to respond to changes in model module 506. Consequently, an application program written for one specific platform or operating system could be ported to another platform or operating system, provided model module 506 and controller module 502 are written in a cross-platform language. Using MVC architecture 500, an application program may be ported to a new operating system by rewriting the user interface views for the new operating system, and plugging the new views into the existing model module 506 and controller module 502. This may be easier than compared to the considerably more difficult task of rewriting the entire core of the application program.

In one embodiment, for example, views for different operating systems may be predefined for multiple operating systems. When an application program is provisioned for a particular mobile computing device, the application program may be executed using a view appropriate for a given operating system used by the mobile computing device. The embodiments are not limited in this context.

In various embodiments, a model driven application framework for mobile computing device 110 may be implemented using MVC architecture 500. As previously described, mobile computing device 110 may have limited device resources in terms of processing power, memory capacity, battery life, and so forth. MVC architecture 500 may provide a software design that reduces processing cycles (lightweight) and decreases the size (footprint) of application programs for mobile computing device 110. As a result, mobile computing device 110 may store and execute an increased number of application programs. Mobile computing device 110 may also be implemented with different operating systems using the same application programs with little or no modification. When modifications are needed, the modifications may be centered around designing new views for the application program, or retrieving predefined views for a given operating system, as implemented using view modules 504*a*, 504*b*. Such views are sometimes referred to as "skins."

In various embodiments, an application framework using MVC architecture 500 may be designed to increase the efficiency and performance of mobile computing device 110. The term "application framework" may refer to a set of libraries or classes that are used to implement the standard structure of an application program for a specific operating system. By bundling a large amount of reusable code into a framework, application development time may be reduced since an application developer may be saved the task of rewriting large amounts of standard code for each new application that is developed. The use of an application framework and a GUI tends to promote a standard structure for application programs. It may also be easier to create automatic GUI creation tools when a standard application framework is used, since the underlying code structure of the application is known in advance. Object-oriented programming (OOP) techniques are usually used to implement application frameworks such that the unique parts of an application can simply inherit from pre-existing classes in the application framework. Consequently, a robust and flexible model driven application framework may be created by combining OOP techniques, a uniform data access layer, and MVC architecture 500.

In various embodiments, MVC 500 may be used to create an application framework suitable for use with a mobile computing device, such as mobile computing device 110. In one embodiment, for example, the application framework may be implemented using OOP techniques. OOP is a computer programming paradigm that assumes a computer program is composed of a collection of individual units, or objects, as opposed to a traditional assumption that a program is a list of instructions to the computer. Each object is capable of receiving messages, processing data, and sending messages to other objects. Almost any concept may be represented as an object. Examples of an object may include menu objects, image objects, frame objects, title objects, border objects, tab objects, list objects, color blue objects, button objects, scroll bar objects, text field objects, text and image objects, and so forth. The embodiments are not limited in this context.

In various embodiments, the application framework may comprise an application program having a dynamic set of interacting objects. An object may comprise an abstract concept to encompass a software bundle having data members (properties or attributes) to represent data associated with the object, and methods that access the data members in predefined ways. As used in the context of OOP, the term "method" may refer to a piece of code that is exclusively associated either with a class (e.g., called class methods or static methods) or with an object (e.g., called instance methods). Like a procedure in procedural programming languages, a method usually consists of a sequence of statements to perform an action, a set of input parameters to parameterize those actions, and possibly an output value (e.g., called return value) of some kind. The purpose of methods is to provide a technique for accessing (for both reading and writing) the private data stored in an object or a class. An example of objects for a given application program designed within a model driven application framework for mobile computing device 110 may be described with reference to FIG. 6.

Figure 6:
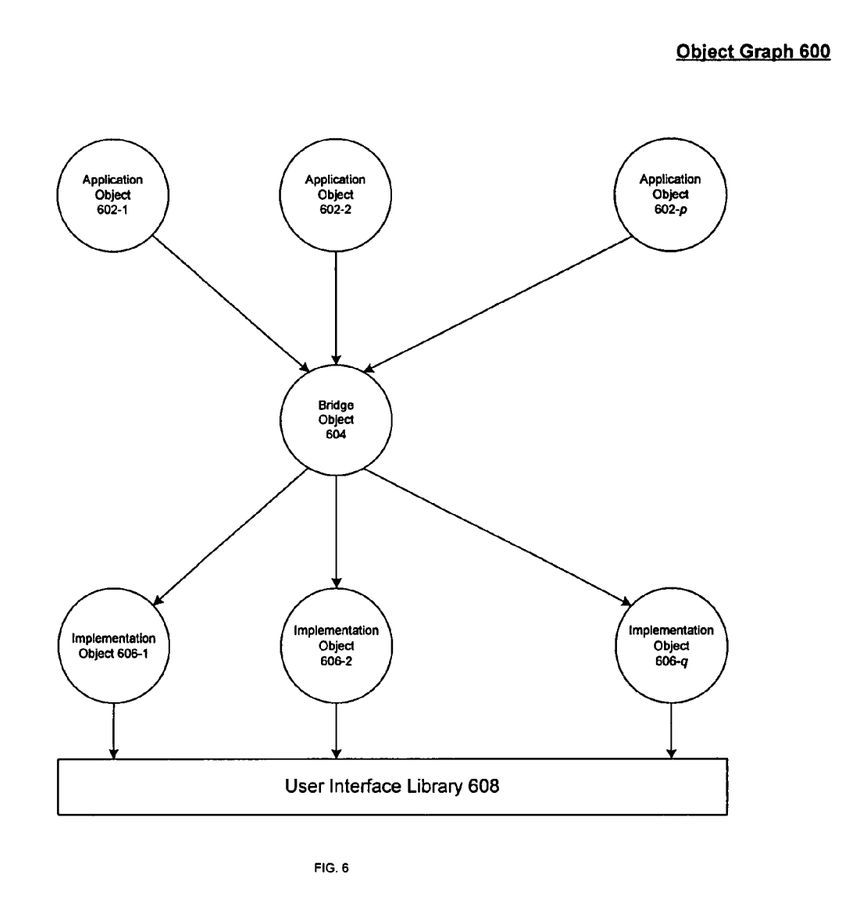
FIG. 6 illustrates one embodiment of an object graph.

FIG. 6 may illustrate one embodiment of an object graph. FIG. 6 may illustrate an object graph 600. Object graph 600 may illustrate some of the objects used to implement an application program having a GUI for mobile computing device 110. As shown in FIG. 6, object graph 600 may comprise one or more application objects 602-1-*p*, a bridge object 604, and implementation objects 606-1-*q*. It may be appreciated that more or less objects may be used for an application program, and the objects illustrated in object graph 600 are by way of example only. The embodiments are not limited in this context.

Each type of objects 602, 604 and 606 may have its own characteristics and state. Each type of object may also be created according to a particular class. A class may detail, or specify, exactly how an object should appear and how it is to behave. Instructions for creating software objects are carefully written into the class using variables for data and information, and methods for the manipulation of that data and information. The classes may include predefined classes from a class library, or classes created for a specific application program. Typical predefined classes include premade objects of an application, such as buttons, menus, fonts, colors, and so forth. The embodiments are not limited in this context.

In various embodiments, application objects 602-1-*p* may be used to implement control logic or business logic for an application program. Application objects 602-1-*p* may be in communication with bridge object 604 and other objects as well. Application objects 602-1-*p* may be event driven, similar to controller 502 of MVC architecture 500. Application objects 602-1-*p* typically comprise part of the model layer as represented by model module 506. More particularly, application objects 602-1-*p* may be responsible for maintaining information about the data store. An Item and ItemDataSource objects are examples of application objects 602-1-*p* for a typical application program. In the email example, model objects such as VMMailMessage provide all pertinent information about a particular message while the VMMsgDataSource is responsible for producing a series of message objects. As new email messages arrive at mobile computing device 110 via radio sub-system 202, the model objects may broadcast received changes so objects in the view layer, such as VMTable or VMFolderCountLabel, can display the information. As any message changes are received by mobile computing device 110 via radio sub-system 202, the appropriate message object will broadcast its changes to the platform independent view layer for update. As the user interacts with the various messages (e.g., open, delete, respond, forward, and so forth), the controller objects, such as VMMainViewController, will interact directly with the model objects to initiate the action. The result of the action (e.g. a missing message in case of a delete action), will be reflected back to the view objects using the same technique as a deletion coming from outside mobile computing device 110.

In various embodiments, bridge object 604 may be used to implement a platform independent conceptual interface for the application programmer. Referring again to the email example, the application programmer would always know that they are allowing the user to type an email address into a TextField object. The application programmer is calling and manipulating the data to implement advanced features such as type-ahead smart addressing. The TextField bridge object performs all receipt of programmer interactions and internally manages and calculates changes while using an implementation object to manage the system specific text editing capabilities.

In various embodiments, implementation objects 606-1-*q* may be used to implement a specific look and feel desired for users of mobile computing device 110. The look and feel may be specific to a small form factor smart phone or a larger form factor computing device. In the same email example, for example, the FooPlatformTextFieldImpl will answer all generic questions the bridge object will have about the real system and will physically implement the intention of the bridge object.

It may be appreciated that the examples given for application objects 602-1-*p*, bridge object 604, and implementation objects 606-1-*q*, are merely some of the types of objects used for a given application program. The specific objects for a given application program may vary in accordance with a given set of design constraints as desired for a specific implementation. The embodiments are not limited in this context.

In various embodiments, implementation objects 606-1-*q* may send messages to user interface library 608. User interface library 608 may comprise a computer program library. In computer programming, a library may comprise a collection of subprograms used to develop software. Libraries are typically distinguished from executables in that they are not independent programs. Rather, the subprograms are utility code that provides services to some other independent program.

In one embodiment, for example, user interface library 608 may comprise a collection of user interface subprograms or API that are part of a native GUI toolkit for an operating system. Each operating system typically includes a user interface library to assist in rendering and displaying information on a display, such as display 104. In essence, the user interface library provides the look, feel and functional aspects of a GUI. Examples of subprograms may include drawing windows or shapes on a display, presenting lists or tables, drawing buttons, adding colors or color schemes, displaying alphanumeric text or symbols, and so forth. The user interface library typically varies with different operating systems. For example, the look and feel of a GUI for a mobile computing device using a Palm OS is substantially different from a mobile computing device using a Pocket PC OS.

In various embodiments, implementation objects 606-1-*q* may use a set of API from user interface library 608 to create a graphic user interface for an application program. As the operating system varies, the set of API for user interface library 608 may also change to the API corresponding to the new operating system. Since implementation objects 606-1-*q* do not have to be changed, or substantially modified, the same application program may be implemented for different operating systems using the model driven application framework of mobile computing device 110.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
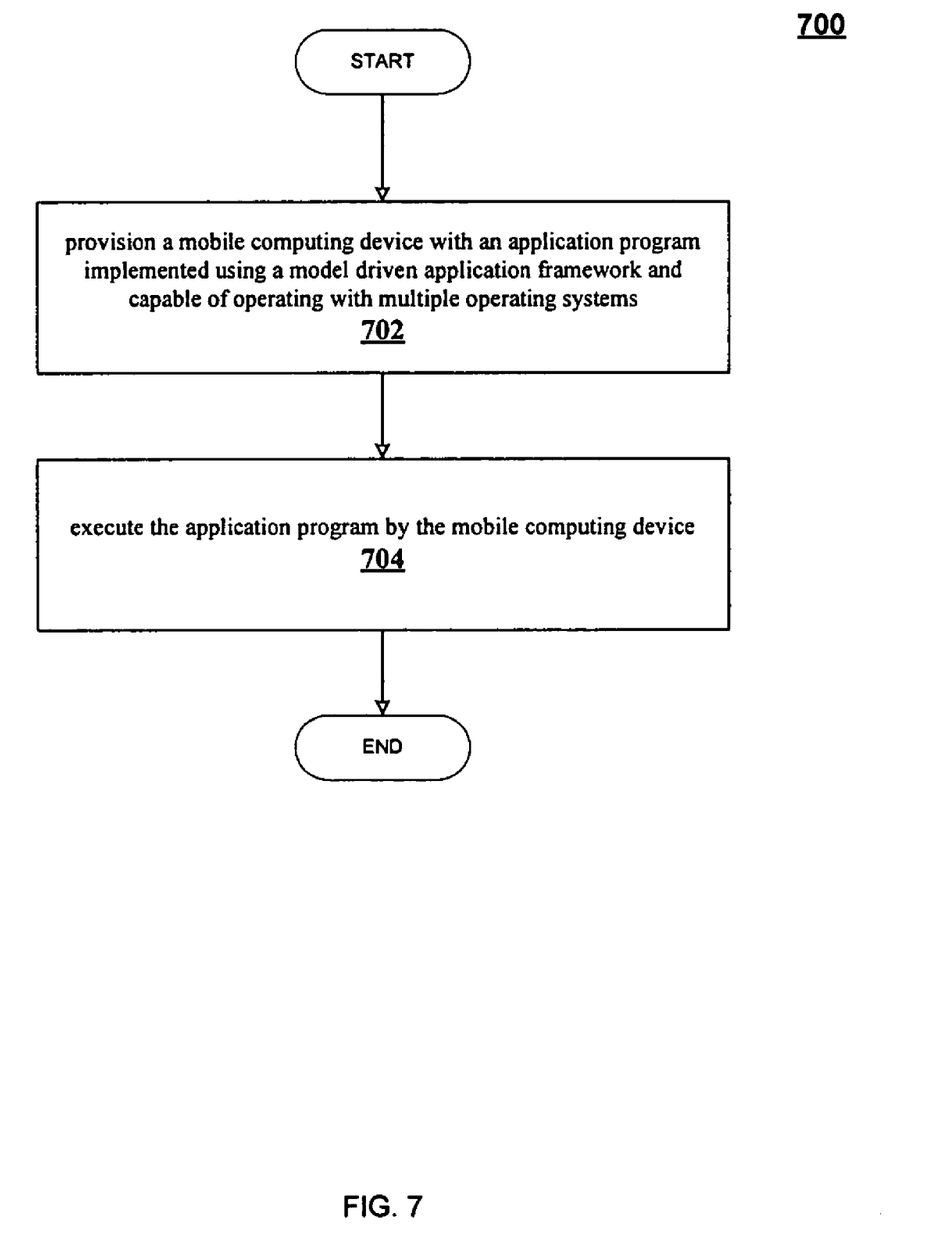
FIG. 7 illustrates one embodiment of a logic diagram.

FIG. 7 illustrates one embodiment of a logic flow. FIG. 7 illustrates a logic flow 700. Logic flow 700 may be representative of the operations executed by one or more embodiments described herein, such as mobile computing device 110. As shown in logic flow 700, a mobile computing device may be provisioned with an application program implemented using a model driven application framework and capable of operating with multiple operating systems at block 702. The application program may be executed by the mobile computing device at block 704.

In one embodiment, for example, one or more event messages may be received for the application program at a controller layer. Information may be retrieved from a model layer. Information for the model layer may be modified in response to the event messages. The information may be rendered into a view suitable for interaction with a user using a view layer. The embodiments are not limited in this context.

In one embodiment, for example, information may be retrieved from a data access layer using a set of standard interfaces. The information may be rendered using a set of user interface application program interfaces corresponding to one of the operating systems. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a processing sub-system having a processor and memory, said memory to store software components for execution by said processor, said software components comprising an application program implemented using a model driven application framework including a data model and capable of operating with multiple operating systems: and
wherein the application framework has a model-view-controller software architecture comprising a controller module, view module, model module, and data module; and
wherein said model module is platform-independent, such that changing the operating system with which said application program operates does not include modification of said model module.

2. The mobile computing device of claim 1, said application framework comprising a set of subroutines for a software library.

3. The mobile computing device of claim 1, said application program to comprise a set of application objects, a bridge object, and a set of implementation objects.

4. The mobile computing device of claim 1, each operating system to have a set of application program interfaces to create a graphic user interface, said application program to include a set of implementation objects, and said implementation objects to use each set of application program interfaces to create a graphic user interface for said application program for said multiple operating systems.

5. The mobile computing device of claim 1, said model-view-controller architecture including a data access layer implemented using IData interfaces.

6. A system, comprising:
an antenna;
a radio sub-system to connect to said antenna, said radio sub-system to perform voice communications; and
a processing sub-system to connect to said radio sub-system, said processing sub-system having a processor and memory, said memory to store software components for execution by said processor, said software components comprising an application program implemented using a model driven application framework including a data model and capable of operating with multiple operating systems: and
wherein the application framework has a model-view-controller software architecture comprising a controller module, view module, model module, and data module; and
wherein said model module is platform-independent, such that changing the operating system with which said application program operates does not include modification of said model module.

7. The system of claim 6, said application framework comprising a set of subroutines for a software library.

8. The system of claim 6, said application program to comprise a set of application objects, a bridge object, and a set of implementation objects.

9. The system of claim 6, each operating system to have a set of application program interfaces to create a graphic user interface, said application program to include a set of implementation objects, said implementation objects to use each set of application program interfaces to create a graphic user interface for said application program for said multiple operating systems.

10. The system of claim 6, said model-view-controller architecture including a data access layer implemented using IData interfaces.

11. A method, comprising
provisioning a mobile computing device with an application program implemented using a model driven application framework including a data model and capable of operating with multiple operating systems;
executing said application program by said mobile computing device;
receiving event messages for said application program at a controller layer;
retrieving information from a model layer;
rendering said information into a view suitable for interaction with a user using a view layer; and
wherein the model driven application framework has a model-view-controller software architecture comprising a controller module, view module, model module, and data module; and
wherein the step of retrieving said information from said model layer is platform-independent, such that changing the operating system with which said application program operates does not include modification of said model module.

12. The method of claim 11, comprising modifying said information for said model layer in response to said event messages.

13. The method of claim 11, comprising retrieving information from a data access layer using a set of standard interfaces.

14. The method of claim 11, comprising rendering said information using a set of user interface application program interfaces corresponding to one of said operating systems.

15. The method of claim 11, said model-view-controller architecture including a data access layer implemented using IData interfaces.

16. An article comprising a machine-readable storage medium containing instructions that if executed enable a system to provision a mobile computing device with an application program implemented using a model driven application framework including a data model and capable of operating with multiple operating systems, and execute said application program by said mobile computing device;
wherein the article further comprises instructions that if executed enable the system to receive event messages for said application program at a controller layer, retrieve information from a model layer, and render said information into a view suitable for interaction with a user using a view layer; and
wherein the model driven application framework has a model-view-controller software architecture comprising a controller module, view module, model module, and data module; and
wherein said model module is platform independent, such that changing the operating system with which said application program operates does not include modification of said model module.

17. The article of claim 16, further comprising instructions that if executed enable the system to modify said information for said model layer in response to said event messages.

18. The article of claim 16, further comprising instructions that if executed enable the system to retrieve information from a data access layer using a set of standard interfaces.

19. The article of claim 16, further comprising instructions that if executed enable the system to render said information using a set of user interface application program interfaces corresponding to one of said operating systems.

20. The article of claim 16, said model-view-controller architecture including a data access layer implemented using IData interfaces.

* * * * *

UNITED STATES PATENT AND TRADEMARK OFFICE
CERTIFICATE OF CORRECTION

| | | |
|---|---|---|
| PATENT NO. | : 7,917,915 B2 | Page 1 of 1 |
| APPLICATION NO. | : 11/229473 | |
| DATED | : March 29, 2011 | |
| INVENTOR(S) | : Michael D. Bonnette et al. | |

It is certified that error appears in the above-identified patent and that said Letters Patent is hereby corrected as shown below:

On the face page, in field (73), Assignee, in column 1, line 2,
delete "Comapny," and insert -- Company, --, therefor.

Signed and Sealed this
Second Day of August, 2011

David J. Kappos
*Director of the United States Patent and Trademark Office*